United States Patent [19]

Wildermuth

[11] Patent Number: 4,961,719
[45] Date of Patent: Oct. 9, 1990

[54] VARIABLE DRIVE TRANSMISSION

[75] Inventor: Don A. Wildermuth, Verdi, Nev.

[73] Assignee: Gruber, Kaplan & Associates, San Rafael, Calif.

[21] Appl. No.: 382,817

[22] Filed: Jul. 19, 1989

[51] Int. Cl.⁵ .............................................. F16H 55/52
[52] U.S. Cl. ........................................ 474/50; 474/56
[58] Field of Search .................................. 474/49–56, 474/101, 109, 111, 133, 135

[56] References Cited

U.S. PATENT DOCUMENTS

| 616,630 | 0/1898 | Pratt | 474/49 X |
|---|---|---|---|
| 698,854 | 4/1902 | Pratt | 474/49 X |
| 1,496,032 | 6/1924 | Sleeper | 474/49 X |
| 2,584,447 | 2/1952 | Hayot | 74/217 |
| 3,956,944 | 5/1976 | Tompkins | 74/244 |
| 3,969,948 | 7/1976 | Pipenhagen, Jr. | 74/244 |
| 3,995,508 | 12/1976 | Newell | 74/244 |
| 4,068,539 | 1/1978 | Nye | 74/230 |
| 4,373,926 | 2/1983 | Fullerton | 474/57 |
| 4,781,663 | 11/1988 | Reswick | 474/56 X |
| 4,787,879 | 1/1988 | Pritchard | 474/56 X |
| 4,836,046 | 6/1989 | Chappel | 474/56 X |

FOREIGN PATENT DOCUMENTS 55912 of 1935 Norway .
174415 of 1935 Switzerland .

Primary Examiner—Thuy M. Bui
Attorney, Agent, or Firm—Townsend and Townsend

[57] ABSTRACT

A drive transmission for work producing mechanism, such as a bicycle or other vehicle, in which a carrier member is mounted on a rotatable crank shaft and has a plurality of spaced, pivotally mounted segments, with each segment carrying a rotatable drive element, such as a chain-engageable sprocket. An endless, flexible member, such as a roller chain, is coupled with the sprocket, each segment being in mesh with a freewheeling gear rotatably mounted on the crank shaft. A chain takeup damper is carried in spaced relationship to the crank shaft and applies tension to a part of the chain at all times. As torque requirements on the crank shaft increase, the other part of the chain increases in tension causing the sprockets to be rotated toward the crank shaft to increase the drive ratio of the transmission. A resilient endless flexible band biases the segments outwardly of the crank shaft and into a maximum drive ratio. A servo system can be used to cause changes in the drive ratio which are dependent upon crank shaft speed instead of torque on a crank shaft.

50 Claims, 9 Drawing Sheets

VARIABLE DRIVE TRANSMISSION

BACKGROUND OF THE INVENTION

1. Field of the Invention

This invention relates to improvements in drive transmissions and, more particularly, to a continuously and automatically variable transmission for use with work producing mechanisms, such as a bicycle.

2. Description of the Prior Art

Continuously variable speed transmissions for bicycles have been patented, but have not achieved commercial application. In such a transmission, a change in the drive ratio is effected through a radially extensible or contractible sprocket assembly mounted on or driven by the bicycle pedal assembly. A disclosure covering such a variable speed transmission is U.S. Pat. No. 3,995,508.

In such patent, a plurality of small sprockets are slidably mounted in radial slots in a main disk, the sprockets being biased toward radially outermost positions and engaging a roller chain for transmitting drive torque at a maximum drive ratio. The radial positions of the sprockets are controlled by spiral grooves in a control disk that is angularly displaceable relative to the main disk against the bias of an adjustable spring which urges the sprockets to their radially outermost positions.

Variable speed transmissions of the types disclosed in the above patent and elsewhere have not been satisfactory because they are complex in construction and are not efficient because of the considerable amount of friction caused by the sliding engagement of the various parts of the transmissions. Some of the deficiencies in the other continuously variable transmissions are:

(1) Roller clutches prevent reverse rotation of sprockets, thus causing the chain to jump off the sprockets when the mechanism moves from its maximum to its minimum diameter.
(2) Roller clutches are too small to survive for a long period of time under the loads imposed.
(3) Metallic springs cannot produce the needed stiffness and total deflection required within the space allowed.
(4) No provisions for allowing each individual sprocket to rotate forward or backward as required during chain engagement to assure that such engagement is smooth.

Because of these drawbacks, a need exists for an improved variable speed transmission which minimizes contact between parts but which provides for a continuously and automatically variable drive ratio between maximum and minimum values. The present invention satisfies this need.

SUMMARY OF THE INVENTION

The present invention, in a first embodiment, is directed to a transmission for a bicycle in which a carrier member mounted on a bicycle crank shaft has a plurality of pivotally mounted segments thereon with each segment carrying a chain engageable sprocket and with each segment having a toothed link in mesh with a freewheeling spur gear rotatably mounted on the crank shaft. Thus, as torque input to the transmission increases, the segments will be automatically rotated in such a direction that the sprockets on the segments will be moved substantially radially inwardly toward the crank shaft to thereby increase the tension in the chain and thus torque applied to the rear wheel through the chain. Instead of a chain and sprockets, an endless flexible belt and pulleys can be used.

Means is provided in the form of a resilient, endless flexible band for biasing the segments in a manner such that the sprockets are biased outwardly of the crank shaft and into the maximum effective diameter condition of the transmission under light pedal loads.

Other embodiments of the transmission include servo control systems which provide continuously variable transmissions which are a function of the speed at which the vehicle is pedalled.

The embodiments of the transmission of the present invention are simple and rugged in construction, are inexpensive to produce and assemble, and have features which render them more efficient in operation than conventional variable speed transmissions.

The primary object of the present invention is to provide an improved transmission for a bicycle in which the transmission is continuously and automatically variable and has relatively few parts in engagement with each other to thereby minimize frictional effects in achieving sprocket diameter changes.

Another object of the present invention is to provide an improved transmission of the type described, wherein the transmission is simple and rugged in construction, is inexpensive to produce and assemble and can be used on all types of bicycles as new equipment or as a replacement part.

Other objects of this invention will become apparent as the following specification progresses, reference being had to the accompanying drawings for an illustration of the invention.

DETAILED DESCRIPTION OF THE PREFERRED EMBODIMENTS

Figure 1:
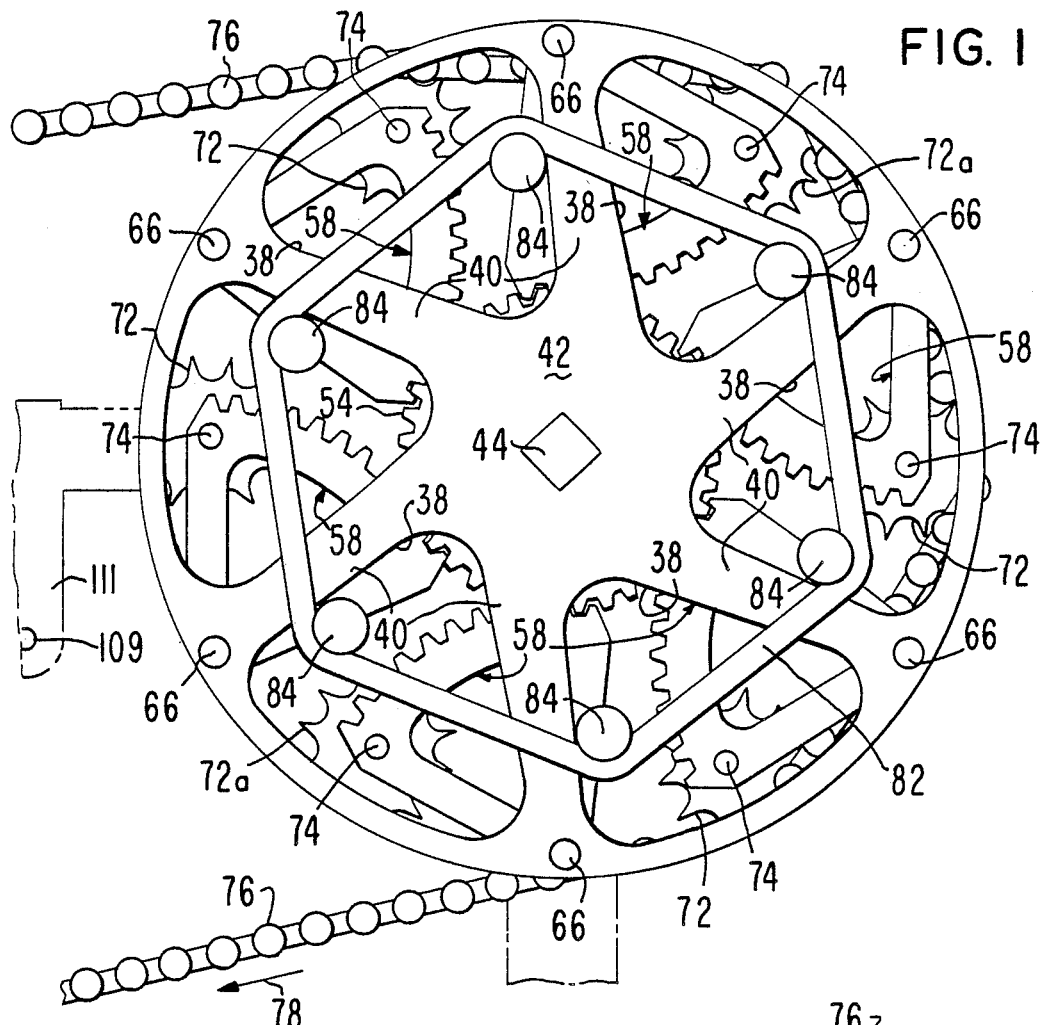
FIG. 1 is a side elevational view of the front part of the bicycle transmission of the present invention, showing the transmission in a maximum diameter condition.

The continuously and automatically variable transmission which is the subject of the present invention is broadly denoted by the numeral 10 and is adapted to be used with a bicycle having a frame 12 provided with a hub 14 through which a pedal crank shaft 16 extends. Hub 14 is provided with spaced bearings 18 and 20 for journalling the shaft 16 for rotation about the central axis of the hub. Transmission 10 as hereinafter described is carried by an extension 22 of shaft 16. Pedal crank arms 24 and 26 are secured in any suitable manner to the outer ends of crank shaft 16, such as by nuts on the threads at locations 27 and 28. Pedals 30 are mounted on the outer ends of pedal crank arms 24 and 26 in the usual fashion.

Figure 2:
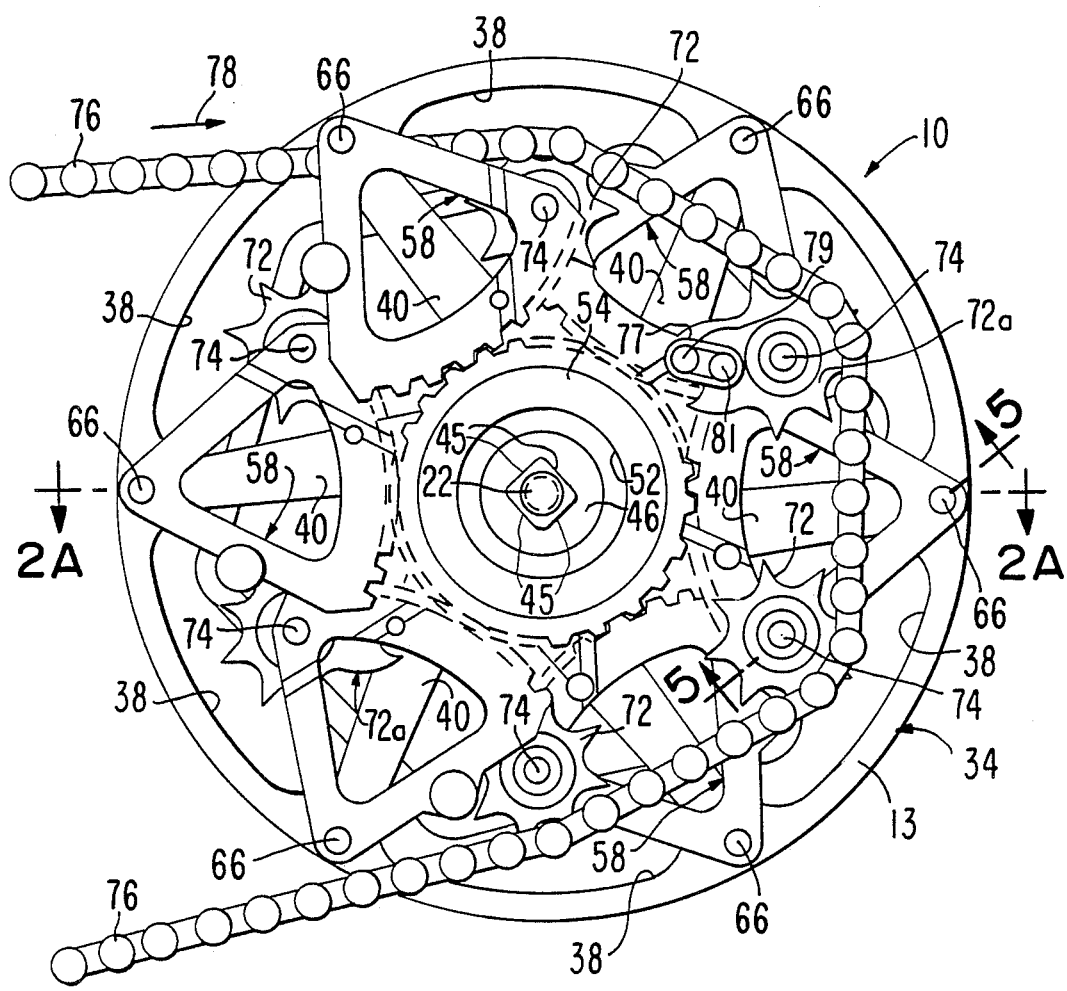
FIG. 2 is a view similar to FIG. 1 but showing the front carrier plate and spring removed, and the transmission in a mid-diameter condition.
Figure 3:
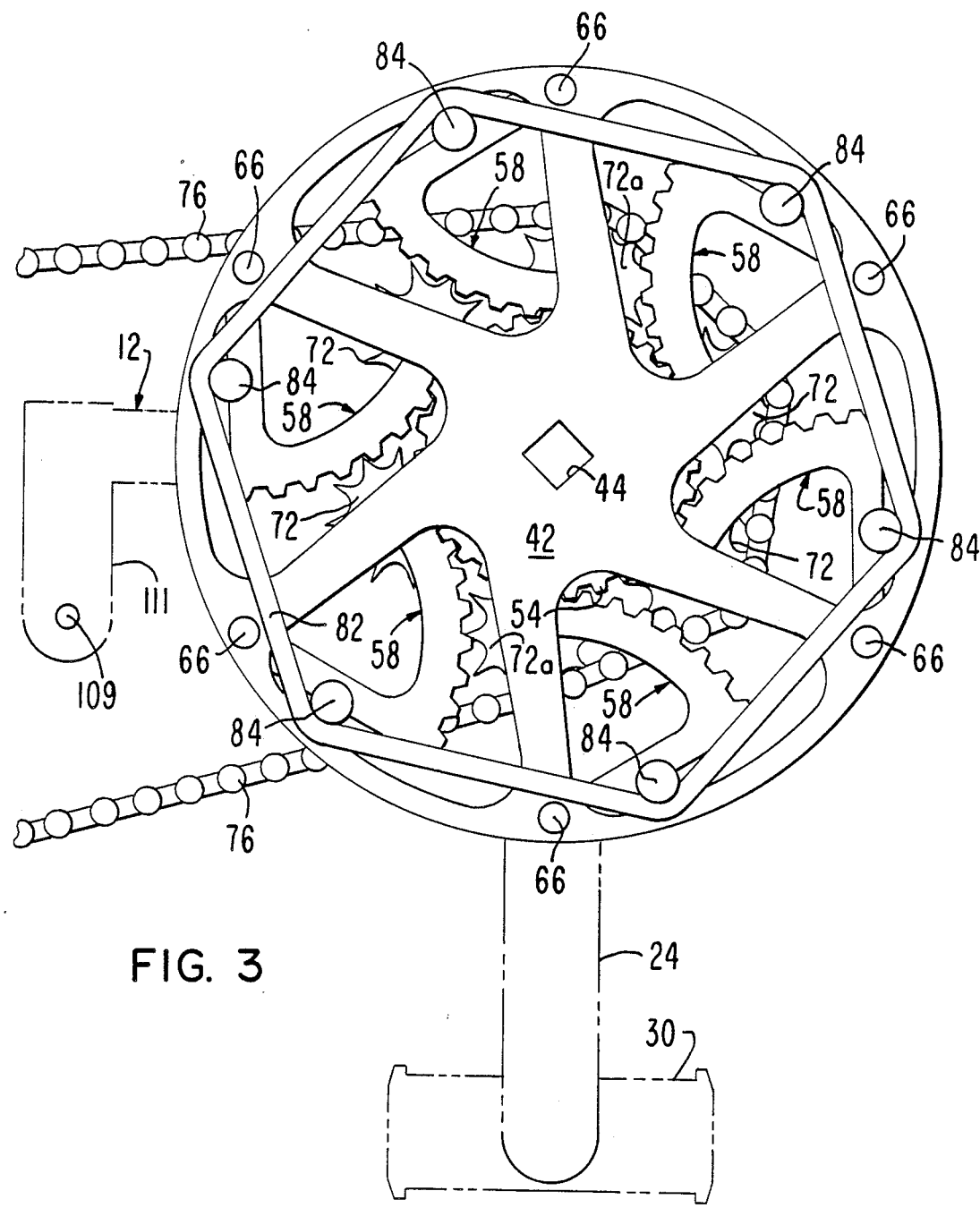
FIG. 3 is a view similar to FIG. 1 but showing the front part of the transmission in a minimum diameter condition.
Figure 3A:
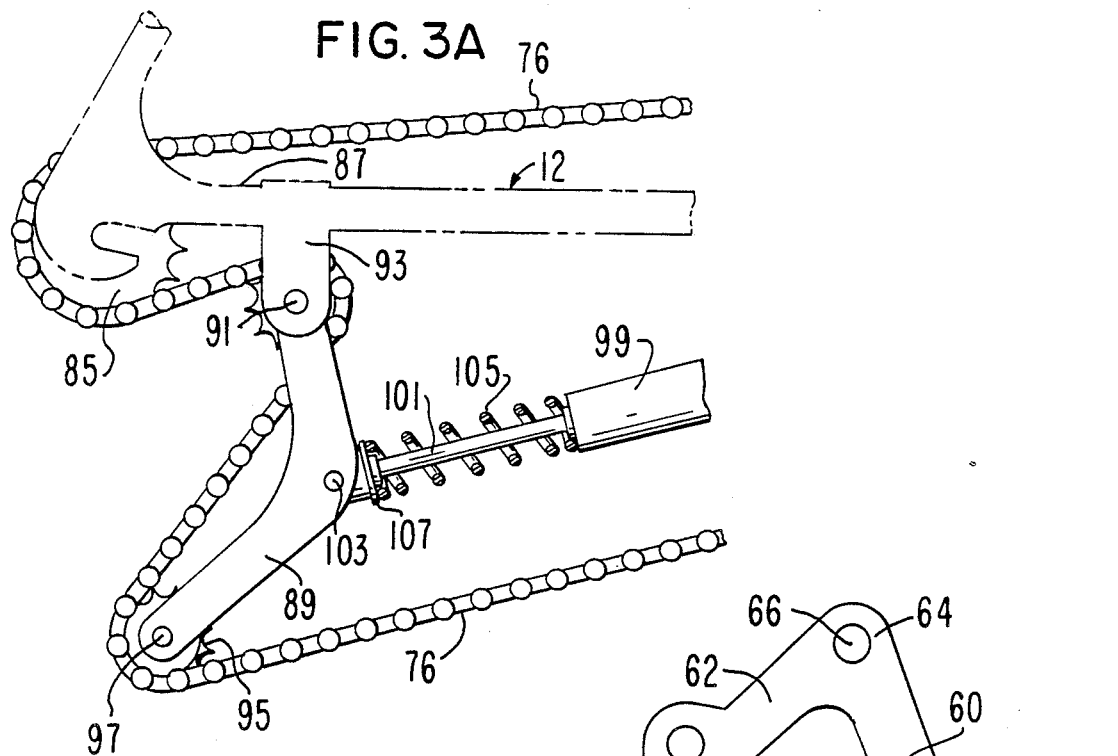
FIG. 3A is a view similar to FIG. 1A but showing the rear part of the transmission in a minimum diameter condition.

Transmission 10 includes a pair of parallel carrier plates 32 and 34 (FIGS. 1-4) with each of the carrier plates having a circular outer periphery 36 and provided with a plurality of triangularly shaped holes 38 which define spokes 40 as shown in FIGS. 1-3. Each carrier plate has a central portion 42 (FIG. 1) integral with the inner ends of spokes 40, each carrier plate further having a hole 44 (FIG. 1) for receiving four flats 45 (FIG. 2) on extension 22 of shaft 16. Each hole 44 is square and is complemental to the outer flats 45 of extension 22. Thus, carrier plates 32 and 34 will be aligned with each other and coupled to and rotate with crank shaft 16 as the latter is rotated to transfer torque from extension 22 to carrier plates 32 and 34 under the influence of the pedalling by the rider of the bicycle.

An annular spacer or bushing 46 (FIGS. 2 and 2A) has a central hole 48 which is complemental to the outer surface of shaft extension 22. Spacer 46 rotatably mounts the hub 52 (FIGS. 2 and 2A) of a spur gear 54 having two sets of teeth 56 on the outer periphery thereof. Gear 54 is freely rotatable on extension 22 of the shaft 16.

Instead of a bushing 46, a rotary dashpot could be used to serve as a bushing while providing viscous shear drag anytime the gear 54 rotates with respect to shaft extension 22 and carrier plates 32 and 34. The two sets of teeth of gear 54 are spaced inwardly from and are in proximity to the inner surfaces of respective carrier plates 32.

Carrier plates 32 and 34 are identical to each other and preferably are stamped from steel sheets. The square holes 44 and their central hubs will slide over the square shaft extension 22, and all driving torque will come through this interface. The cut out portion or holes 38 in the carrier plate are provided to keep the weight of the carrier plates to a minimum and are shaped to allow dirt and other foreign materials to be squeezed out of the gear teeth or gear parts and sprockets yet to be defined between the carrier plates 32 and 34. Spacer 46 serves to maintain the proper distance between the two carrier plates 32 and 34. The outside diameter of the spacer also serves as the bearing journal that the center gear 54 rotates on. The bushing could be made from oil-impregnated bronze, steel, carbon or one of the self-lubricated composite materials. If made of steel, some form of plated lubricant would be necessary on its outer surface.

Each of carrier plates 32 and 34 is provided with a number of triangularly-shaped segments 58 which are pivotally mounted on the respective carrier plate near the outer peripheral part 36 (FIG. 2) thereof. For purposes of illustration, there are six segments 58 for each carrier plate 32, respectively. The segments are between the carrier plates and are uniformly spaced apart about shaft extension 16 as shown in FIG. 2.

Each segment 58 has a pair of arms 60 and 62 which converge toward each other and are integral with each other near a location 64. A pin 66 at location 64 (FIGS. 2, 2A and 4) pivotally mounts the segment on the respective carrier plate 32 or 34 for rotation in opposed directions with respect thereto.

A connecting link 68 is integral with and interconnects the opposite ends of arms 60 and 62 of each segment 58. The outer edge margin of each link 68 is convex and is provided with spaced gear teeth 70 which are in mesh with the adjacent set of teeth 56 of gear 54 as shown in FIG. 2.

Figure 4:
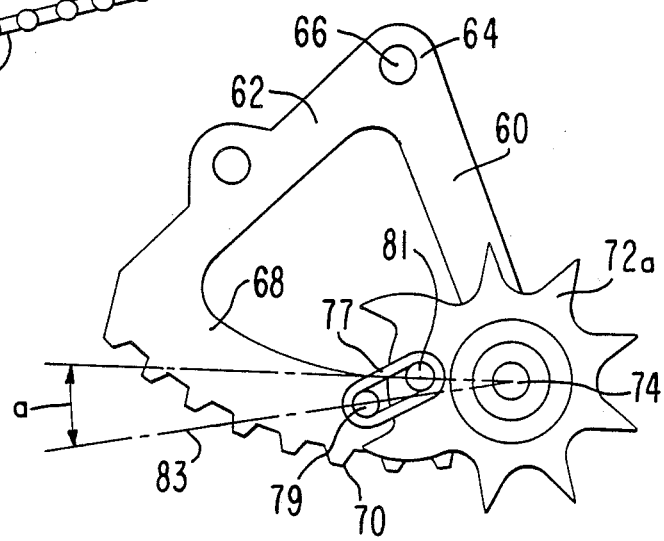
FIG. 4 is an enlarged, side elevational view of one of a number of segments of the transmission, showing a chain-engaging drive sprocket on the segment.
Figure 5:
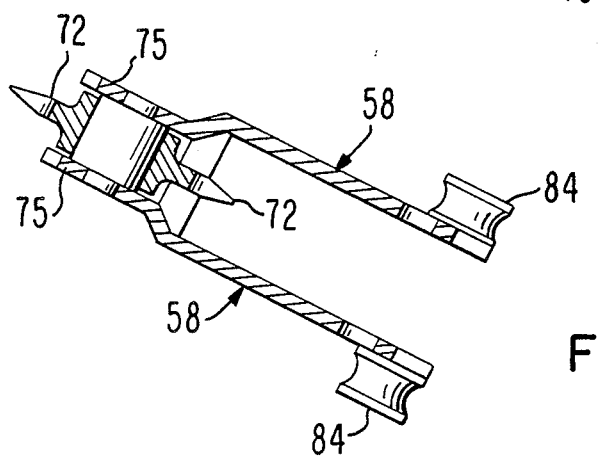
FIG. 5 is a sectional view of the segment of FIG. 4, looking in the direction of line 5—5 of FIG. 4.

Each segment 58 of one carrier plate is adjacent to and laterally aligned with a corresponding segment 58 on the opposite carrier plate. Each pair of adjacent, corresponding segments 58 has a sprocket 72 therebetween and rotatably mounted thereon by a pin or shaft 74 which is connected at the ends thereof to the respective pair of segments 58 at the junction of links 60 and 68 of the respective segments. As shown in FIGS. 4 and 5, each end of pin 74 is carried by the end 75 of segment 58 which is integral with the adjacent ends of arm 60 and link 68 of the segment. FIG. 5 shows the adjacent segments 58 carrying a sprocket 72 therebetween.

A pair of the sprockets, denoted by the numeral 72a, are chain drive sprockets, the remaining sprockets 72 being idler sprockets. An endless, resilient spring 77 is provided for each drive sprocket 72a, respectively, on each side of the drive sprocket, the spring preferably being an O-ring which is coupled to a first pin 79 on link 68 of the segment and to a second pin 81 rotatably mounted on the respective drive sprocket 72a. Spring 77 is used to bias the drive sprocket so that a radial line 83 will normally pass through pin 79 and the respective pin 74 yet the sprocket can rotate through an angle a which is of the order of 15° to 20°.

An endless, flexible drive member, such as a roller chain 76, is coupled with sprockets 72 and 72a and is movable relative to segments 58 as the bicycle is pedalled by the rider of the bicycle. The drive member, therefore, moves in the direction of arrow 78 (FIGS. 1-3). The drive member may be of any suitable construction, so long as it is endless and flexible. For instance, instead of being a roller chain, the drive member could be a flexible belt and sprockets 72 would then be replaced by pulleys coupled with the belt. For purposes of illustration, the drive member will be considered a roller chain.

Figure 1A:
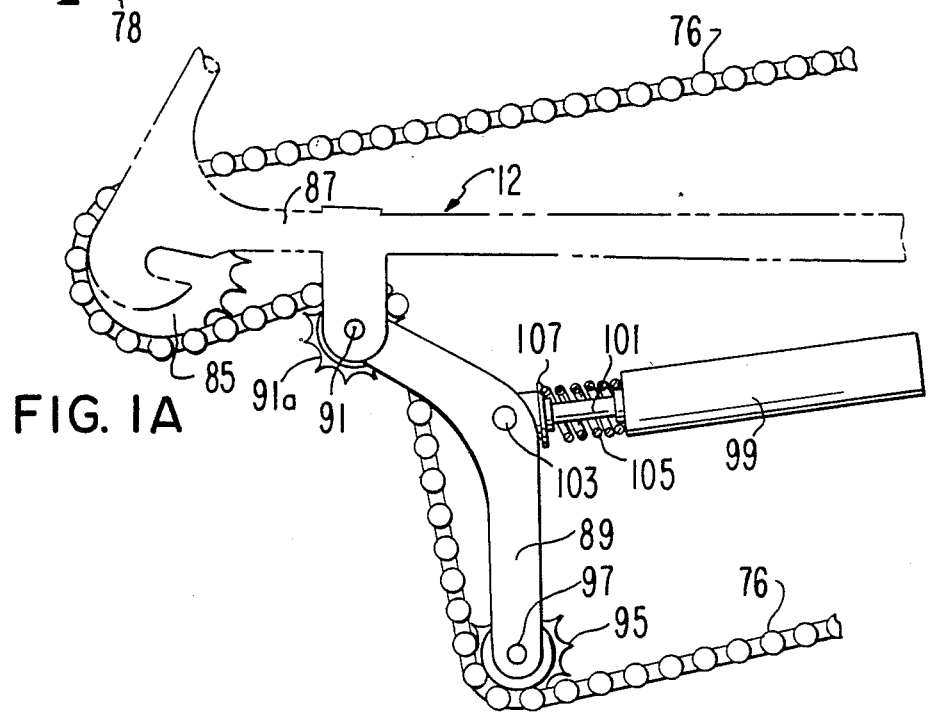
FIG. 1A is a side elevational view of the rear part of the transmission of FIG. 1.

Chain 76 is trained about a rotatable rear sprocket 85 (FIG. 1A) on the rear wheel (not shown) of the bicycle, the rear sprocket being removably coupled to the rear part 87 of bicycle frame 12. Tension is applied to chain 76 by a linear damper in the form of a spring-biased arm 89 pivotally mounted by a pin 91 on a projection 93 integral with frame part 87, the arm having an outer end provided with an idler sprocket 95 which is rotatably mounted by a pin 97 on arm 89. A second idler sprocket 91a is rotatably mounted on pin 91.

A fluid cylinder 99 has a piston rod 101 shiftably mounted therein and the piston rod is coupled by a pin 103 to arm 89 intermediate the ends of the arm. A spring 105 surrounding piston 101 is in engagement at one end thereof to the end plate 107 on piston 101 and in the opposite end thereof internally of and in engagement with an abutment (not shown) in cylinder 99. The cylinder is coupled by a pin 109 (FIG. 1) to a projection 111 extending downwardly from frame part 87 of bicycle frame 12. Spring 105 biases arm 89 in a clockwise sense when viewing FIG. 1A to thereby maintain light tension on the lower part of chain 76.

When chain 76 is coupled in any suitable manner to sprockets 72 and 72a, only the two drive sprockets 72a will actually drive the chain 76. The other four sprockets 72 are free to rotate in either direction.

The two driving sprockets 72a are 180° apart and in line with the pedals. Thus, one drive sprocket 72a engages the chain at the top of the mechanism as the other drive sprocket 72a releases the chain at the bottom of the mechanism. This exchange occurs when the pedals are straight up and down, when very little torque is being applied by the rider of the bicycle. This feature promotes smooth operation, yet allows the transmission to move freely from maximum to minimum diameter and back whenever the chain is engaged to only one driving sprocket, which is about 75% of the time.

By virtue of the pair of O-ring springs 77 for each drive sprocket 72 (FIG. 4), the springs 77 move each drive sprocket 72a to its neutral position as it swings upwardly towards the chain. This feature allows the drive sprocket 72a to move either clockwise or counterclockwise up to about one-half tooth pitch as required to mesh smoothly into the chain.

Sprockets 72 and 72a are rotated with carrier plates 32 and 34 as the crank shaft 16 is rotated. The sprockets are moved radially inwardly when torque requirements on transmission 10 are increased. The movement is from a maximum ratio condition shown in FIG. 1, through an intermediate ratio condition shown in FIG. 2, to a minimum ratio condition shown in FIG. 3. In the latter condition, the sprockets are remote from the outer periphery of carrier plates 32.

A resilient, endless, flexible band or spring 82 is provided for each of carrier plates 32 and 34, respectively. Each band 82 is placed around pins 84 carried by respective segments 58, each pin 84 being mounted in a hole 84a (FIG. 4) intermediate the ends of link 62 of the respective segment 58 as shown in FIGS. 1 and 4. Each band 82 is normally under tension so as to bias pins 84 radially inwardly of the outer periphery of the corresponding carrier plate 32. When so biased, segments 58 are rotatable about the axes of pins 66 in a counterclockwise sense when viewing FIGS. 1–3. Thus, sprockets 72 and 72a are biased into their outer, operative positions shown in FIG. 1 in which transmission 10 is the maximum ratio condition. In such condition, chain tensioner arm 89 near the rear sprocket 85 is at a minimum chain take-up position.

Figure 2A:
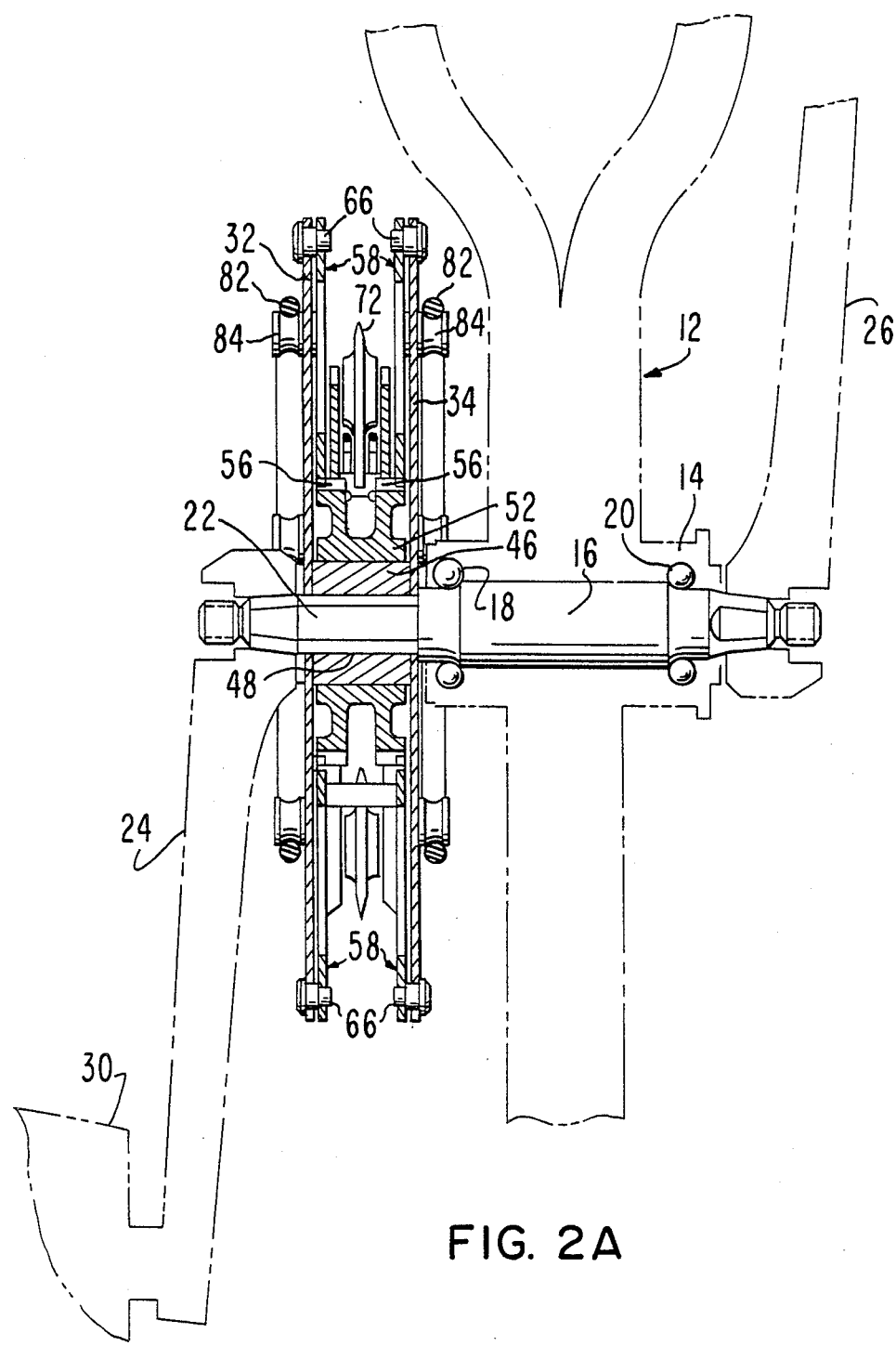
FIG. 2A is a plan view section through the front part of the transmission, showing the way in which it is mounted on the crank shaft of a bicycle, the frame and pedal arms of the bicycle being shown in dashed lines.

Bands 82 are adjacent to the outer faces of respective carrier plates 32 and 34 as shown in FIG. 2A. It is possible that only a single band 82 may be used to bias sprockets 72 and 72a into their outermost positions.

In operation, the rider of the bicycle will pedal the bicycle in the normal fashion to cause shaft 16 to rotate in a clockwise sense when viewing FIGS. 1–3. As shaft 16 rotates, carrier plates 32 and 34 rotate in a clockwise sense when viewing FIGS. 1–3. As this occurs, gear 54 is free-wheeling, and so long as the pedal forces are low, sprockets 72 and 72a will remain in their maximum ratio or outer positions shown in FIG. 1. Tension will remain on the chain 76 by virtue of the chain tensioner arm 89 (FIG. 1A) associated with the transmission 10 on the bicycle.

If, for instance, the bicycle is pedalled uphill, greater torque will be required to turn the crank shaft 16, and sprockets 72 and 72a will tend to move inwardly toward the center portions of carrier plates 32 and 34. FIG. 2 shows an intermediate positions of the sprockets 72 and 72a and FIG. 3 shows final positions of the sprockets 72 and 72a where maximum torque is being applied to the pedals to pedal uphill.

As the sprockets 72 and 72a move inwardly toward the center of the transmission 10, segments 58 will rotate about their respective pins 66 and, because spur gear 54 is free-wheeling, the segments 58 can easily pivot or rotate about their pins 66 relative to carrier plates 32 and 34. So long as the added torque is applied by the pedals to the crank shaft 16, the sprockets 72 and 72a will remain in their FIG. 3 positions producing maximum tension in the upper (driving) portion of the chain. As soon as the need decreases for the additional torque, such as when the bicycle moves once again on flat, horizontal ground, the bands 82 will tend to rotate segments 58 from the FIG. 3 positions thereof to the FIG. 1 positions, thereby automatically causing the sprockets 72 and 72a to move toward the outer periphery of the transmission. The sprockets will move uniformly outwardly because the segments 58 have their teeth 56 in mesh with spear gear 54. Thus, this spur gear will assure that the chain will be uniformly extended radially outwardly of the hubs of carrier plates 32 and the chain tensioner arm 89 will work in the proper manner.

The two drive sprockets 72a are positioned 180° apart. As such, only one drive sprocket is in contact with the chain most of the time. When only one drive sprocket 72a is in contact with the chain 76, the transmission is free to change diameter as the other sprockets 72 in contact with the chain are free to rotate as the tangential distance between adjacent sprockets changes.

There are, however, times when both drive sprockets 72a are in contact with the chain. This condition is shown in FIG. 3. The sprocket 72a at the 12:00 position is fully engaged while the sprocket 72a at the 6:00 position has not yet been lifted off the lower chain. This period of "overlap" encompasses approximately 45° of rotation and occurs when the pedals are near the straight up and down position. During this period of overlap, the transmission cannot increase in diameter, because to do so, would require that the chain between the drive sprockets 72a to stretch, which it cannot do. The transmission is, therefore, "locked up" during periods of overlap.

Gear 54 is free to rotate about spacer 46. The width of the gear is slightly less than that of the spacer; thus, contact with the carrier plates 32 and 34 is incidental and rotation of the gear 54 with respect to the carrier plates is relatively free. The teeth 70 of each segment 58 are in constant mesh with teeth 56 (FIG. 2A) of the gear 54. The gear 54 serves to keep all six sprockets synchronized. The gear 54 rotates typically through a maximum arc of 83°.

Each sprocket shaft 74 fits between respective segments 58 and, along with the segment end pins 66, serves to space the segments 58 by the proper distance apart to keep them parallel. Both the sprocket shafts 74 and pins 66 are pressed into holes in respective segments. No fasteners are required.

The four idler sprockets 72 are free to rotate about their sprocket shafts 74 in either direction. Although these idler sprockets 72 do not drive the chain 76, the normal forces created on these sprockets by the chain are proportional to the tension in the chain. These normal forces create movements about the sprocket pins which are balanced by similar normal forces on the main springs 82 (FIG. 1). Higher tension in the chain 76 caused by torque input through the carrier plates 32 and 34 from pedal forces causes the loaded segments 58 to rotate about their pivot pins 66, stretching the main spring 82 and rotating the gear 54. This gear rotation causes those sprockets 72 not in contact with the chain to also rotate about their pivot pins 66, further stretching the main spring 82. Similar forces act upon the drive sprocket 72a. It is the chain tension which causes the transmission to change diameter. Pedal loads create such chain tension.

The segments 58 are typically stamped from steel sheet. All six left-hand segments 58 are identical as are all six right-hand segments. Shafts 74 have ends which are pressed into holes in segments 58 at the same time segment pins 66 are pressed in place.

Spring pins 84 (FIG. 1) are typically formed from aluminum and pressed into holes 84a. Pins 84 serve to locate and load the main springs 82. These pins extend through holes 38 (FIG. 1) in the carrier plates 32 and 34 and contact the edges of holes 38 at the minimum and maximum diameter positions.

Main springs 82 are typically conventional O-rings stretched around the six spring pins 84 on each side of the transmission. The preload in the springs 82 at the maximum ratio position (FIG. 1) determines the amount of chain tension, thus pedal force, necessary to start ratio reduction. The modulus of elasticity and tension of the springs 82 determine the amount of additional chain tension (pedal force) required to reach the minimum ratio position.

There are a number of elastomers available for this purpose which offer a wide range of characteristics. Thus, the operating range of the transmission can be changed simply by changing springs 82. A Belleville washer 17 (FIG. 2A) holds the outer carrier plate 32 in tight against the spacer 46 as the washer is compressed between the pedal arm and the carrier plate 32.

Pivot pins 66 (FIG. 2A) are typically made of oil impregnated bronze and are press fitted into carrier plates 32 and 34. Pins 66 are stepped. Segments 58 rotate about the smaller diameter portions of pins 66 and the step of each pin 66 keeps the segments 58 from rubbing on carrier plates 32 and 34. Preferably, the chain 76 is a standard ½" pitch bicycle chain.

The damper provided by arm 89 extends freely but resists compression with a force that is proportional to the velocity of compression. As such, the damper is known in engineering circles as a viscous damper.

Heavy pedal forces create tension in the chain and cause the ratio to reduce without any resistance from the extending damper. Thus, ratio reduction is fast. But, as the pedal arms approach vertical, their effective moment arm approaches zero and, therefore, so does the torque input to the carrier plates 32 and 34 and thereby tension in the chain 76. Thus, the primary transmission (without damping) would return to its maximum ratio position (FIG. 1). But the mechanism cannot move to a higher ratio position without compressing the extended damper. The resistance of the damper to sudden compression slows this motion and results in a transmission that is sensitive to average torque input during each revolution rather than instantaneous torque input, thus reducing the "exercising" of the mechanism and thus improving overall efficiency.

The damping forces are applied to the lower portion of the chain. This also helps to pull a chain off the driving sprockets as they pass bottom dead center. This eliminates chain hang up and thus makes the driving sprocket tooth profile less critical.

The chain tensioner arm 89 simply pivots about a single axis. As such, this arm is much less complex than the 3-dimensional mechanism required by conventional derailleur systems. The orientation of the damper arm 89 with respect to the pivot axis thereof makes the damper arm most effective when the transmission is in its minimum ratio position. This is appropriate as the main springs 82 present the greatest return force in this position. Thus, the spring and damper forces are both reduced as the ratio increases.

A servo control system can be used with the transmission of the present invention to control drive ratio based upon pedaling speed rather than pedaling forces. The servo control system is used with the group of elements which includes the carrier plates 32 and 34, segments 58 and spring 82, all collectively called the primary mechanism and denoted broadly by the numeral 120 in FIG. 7.

A tachometer/generator unit 122 is provided near primary mechanism 120 and includes a stator assembly 124 mounted rigidly to the bicycle frame 12 in some suitable location thereon, and a rotor assembly 126 mounted on primary mechanism 120, such as on carrier plate 34 thereof for rotation with the carrier plate. Unit 122 operates at pedal speed and produces a 3-phase AC signal at a frequency that is directly proportional to pedaling speed. A rectifier/regulator module 130 (FIG. 8) converts this variable voltage/variable frequency AC signal to a regulated constant voltage DC output signal which serves to maintain the proper charge on a battery 132 used with the servo system of FIG. 8. A logic module 134 senses the frequency of the AC input signal to the rectifier/regulator module 130 and provides gate drive signals to the inverter 136 of the system which draws DC power from the battery 132 and inverts it to 3-phase AC power to drive the control servo motor 138 (FIG. 6) either forwardly or backwardly as necessary to maintain the desired pedaling speed. The servo system thus described is a completely brushless system.

The tachometer/generator unit 122 is a permanent magnet machine. The stator typically is of a laminated stack of punchings with the armature windings inserted in slots near the surface. The stator assembly 124 is simply pressed onto a cylindrical register on the frame of the bicycle. The permanent magnet rotor 126 is typically spot welded to the inner carrier plate 34 inside the spring pins as shown in FIG. 7.

Servo motor 138 replaces the damper system in the embodiment shown in FIG. 1-3. The motor output shaft 139 is threaded and engages a long nut 140 that pivots about a pin 142 which is carried by chain tensioner arm 144 pivotally mounted by a pin 146 to frame 12 of the bicycle. If the shaft turns in the opposite direction, the chain tension is reduced. It is the operation of motor 138 which causes drive ratio changes, i.e. pivotal movements of drive sprockets 72a. The shaft/nut assembly is not reversible; therefore, motion of the drive sprockets 72a will only occur when initiated by the motor.

Increasing chain tension overcomes the preload in the main springs 82, thus moving the primary mechanism 120 toward a position of lower ratio and higher pedaling speed. Stiffer springs 82 would be required than with the load sensitive mechanism of FIGS. 1-3 because it is not desired that normal pedal forces be relied upon with the servo system of FIGS. 6-8 to cause drive ratio reductions.

Figure 6:
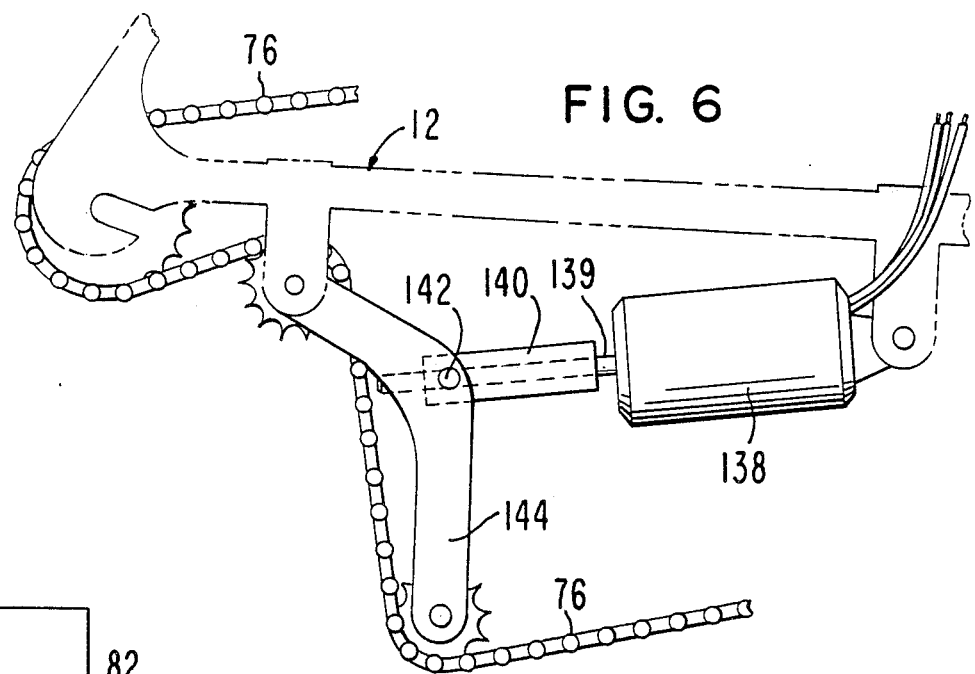
FIG. 6 is a view similar to FIGS. 1A and 3A but showing a rear part of a second embodiment of the transmission of the present invention.
Figure 7:
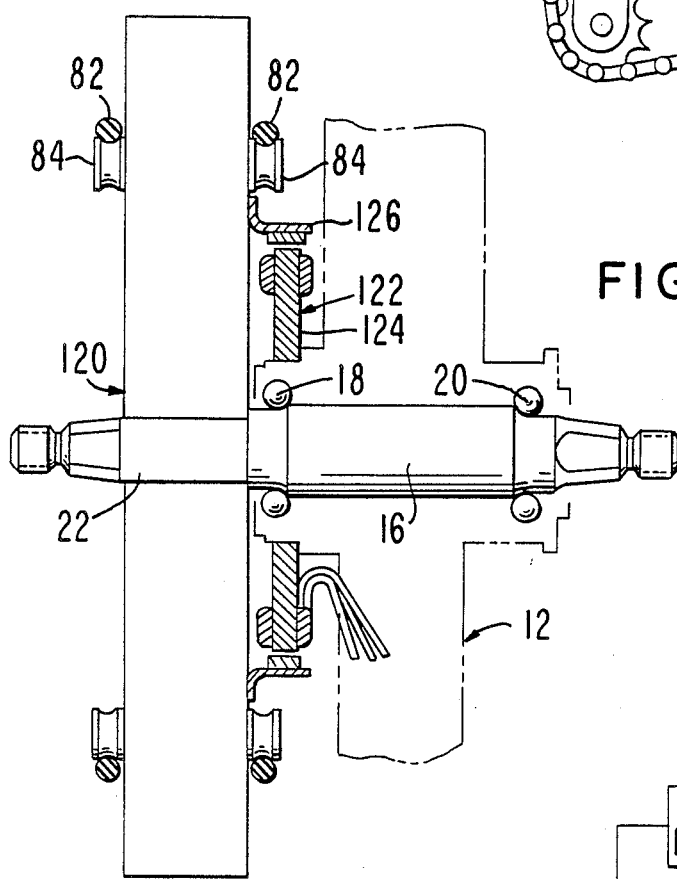
FIG. 7 is a schematic, plan view section similar to FIG. 2A but showing the front part of the transmission shown in FIG. 6.
Figure 8:
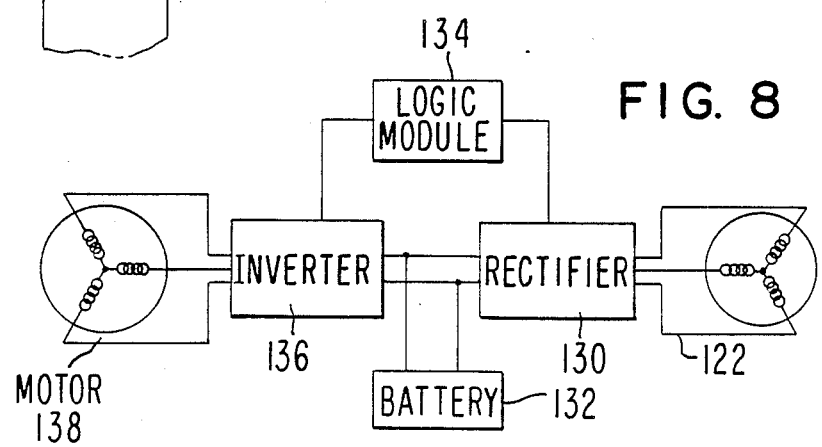
FIG. 8 is a schematic block diagram of the electrical system used with the embodiment of the transmission shown in FIGS. 6 and 7.

A disadvantage of the servo system configuration shown in FIGS. 6-8 is friction. Anytime tension is added to the lower chain stretch, added friction must be overcome when moving the chain around the relatively small sprockets 72 and 72a. Thus, the rider must pedal harder to overcome the added friction. Chain lock-up should not be a problem with this servo system since the motor will act as an infinitely stiff damper, thus pulling the chain off the sprockets very effectively.

Primary mechanism 120 can vary its effective diameter over a range of approximately 1.5 to 1. This is close to the range available on the front sprockets of most derailleur systems. The mechanism is not tolerant of chain misalignment. Thus, it cannot be used with a derailleur system on the rear wheel. Thus, if an overall range in excess of 1.5 to 1 is desired a planetary axle system at the rear wheel may be used.

Figure 9:
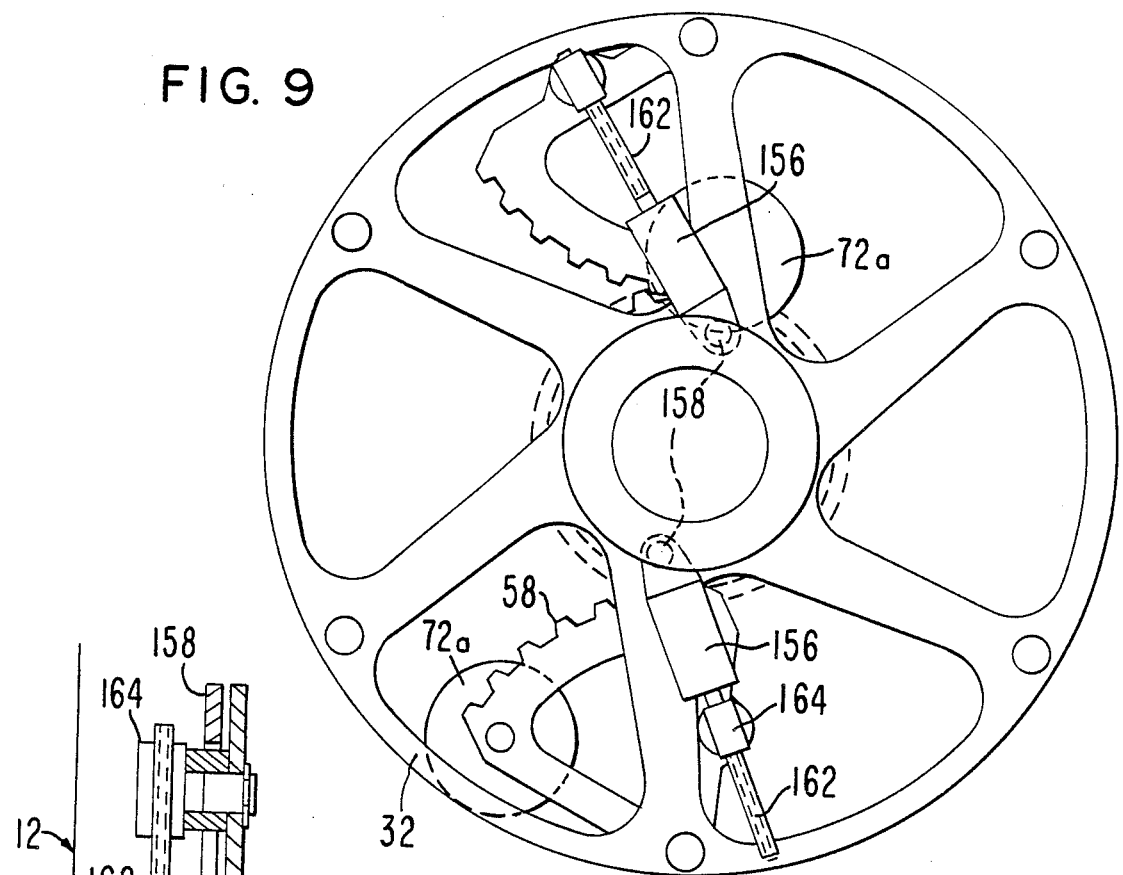
FIG. 9 is a side elevational view of the front part of the transmission for the servo system of FIGS. 10 and 11.
Figure 10:
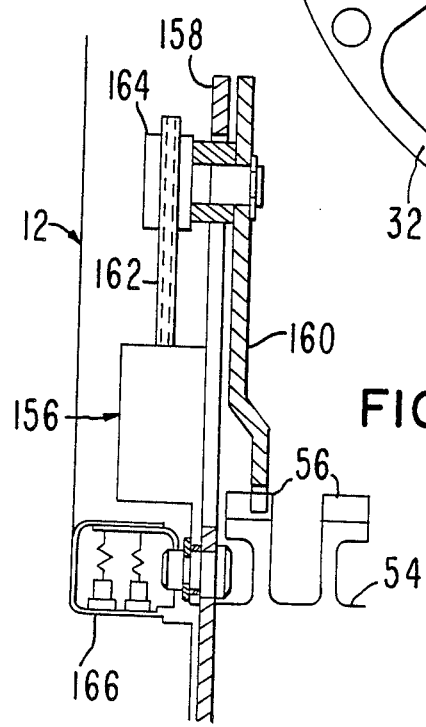
FIG. 10 is a schematic view, partly in section, of a servo system at a segment of one of the segment locations of FIG. 9.
Figure 11:
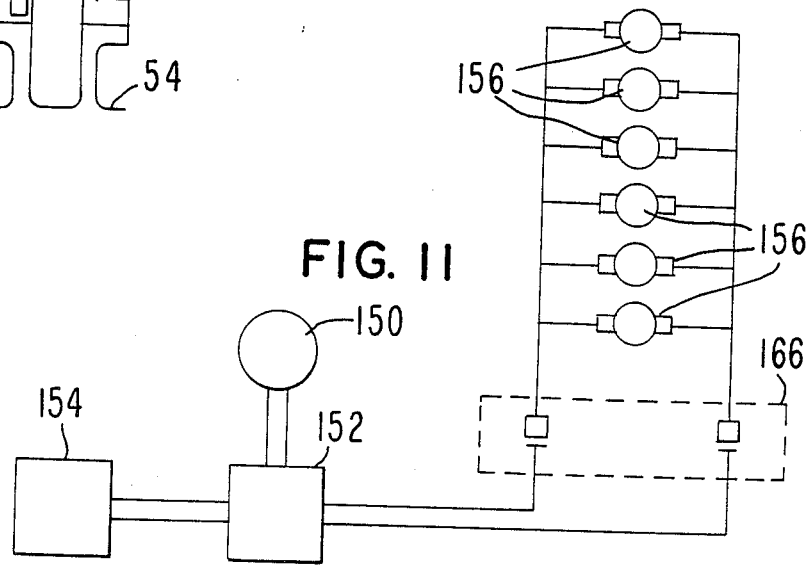
FIG. 11 is a schematic block diagram of the servo system of FIG. 10 showing six servo motors in parallel with each other.

A second embodiment of a servo control system is shown in FIGS. 9-11 and includes a tachometer/generator unit 150 (FIG. 11) mounted on a bicycle frame to provide AC current to a small logic and control unit 152 at a frequency directly proportional to pedaling speed. This AC current signal is used to maintain a charge on a small battery 154. The logic control unit 152 and battery unit 154 occupies a volume of no more than 10 cubic inches and would be secured to the bicycle frame near the pedals.

Logic unit 152 senses input frequency or voltage and compares the input signal with a preset reference frequency or voltage range. Whenever the input value is below the preset range, logic unit 152 draws current from battery 154 to energize small electric motors 156 on carrier plates 158 (only two which are shown in FIG. 9) and carrying segments 58 in the same manner as that described above with respect to FIGS. 1-3. When energized, the small motors 156 cause the effective diameter of the transmission to be reduced. Conversely, whenever the pedaling speed (thus input frequency) exceeds the preset range, such as 60 to 80 rpm, logic unit 152 causes the small motors 156 to rotate in the opposite direction, causing the effective diameter of the transmission to increase. Such a system serves to keep a rider pedaling within the optimum speed range of 60 to 80 rpm without regard to pedal forces. Thus, this servo system might appear to be a better system of control than one based upon pedal forces.

The small motors 156 are pinned by pins 158 to carrier plate 32. Each motor 156 has an output motor drive shaft 162 which is threaded and passes through a swivel nut 164 (FIG. 9) pivotally mounted to the segment having the respective drive sprocket 72a thereon. Clockwise rotation of the motor output shaft causes the segments 58 to move toward a smaller effective diameter; counterclockwise shaft rotation causes the segments to move toward a larger effective diameter. Forces on segments 58 from the pedaling efforts of the rider would not cause any change in diameter because the screw/nut mechanism is not reversible. Thus, changes would occur only when the logic/control unit 152 initiated them.

No springs would be required with the servo system of FIGS. 9-11. No adjustments to the servo system would be required for different riders. Every rider generally is comfortable pedaling in the 60 to 80 rpm range. Any tendency for the chain to hang up when coming off the drive sprockets is eliminated since there are no springs to preload the chain between driving sprockets. The generator/tachometer unit 150 (FIG. 11) could be either an AC or a DC machine. If it were a DC machine, the logic signal would sense voltage. If it were a permanent magnet AC machine, the logic system 152 could sense either voltage or frequency. The frequency option would be more accurate and would be preferred. Although six motors are shown in FIG. 11, it might be possible to use only four, three or even two motors. A possible problem with this servo system is the use of a slip ring assembly 166 (FIG. 10) to couple motors 156 which rotate with the segments 58 to the logic and control unit 152 and battery 154.

Figure 12:
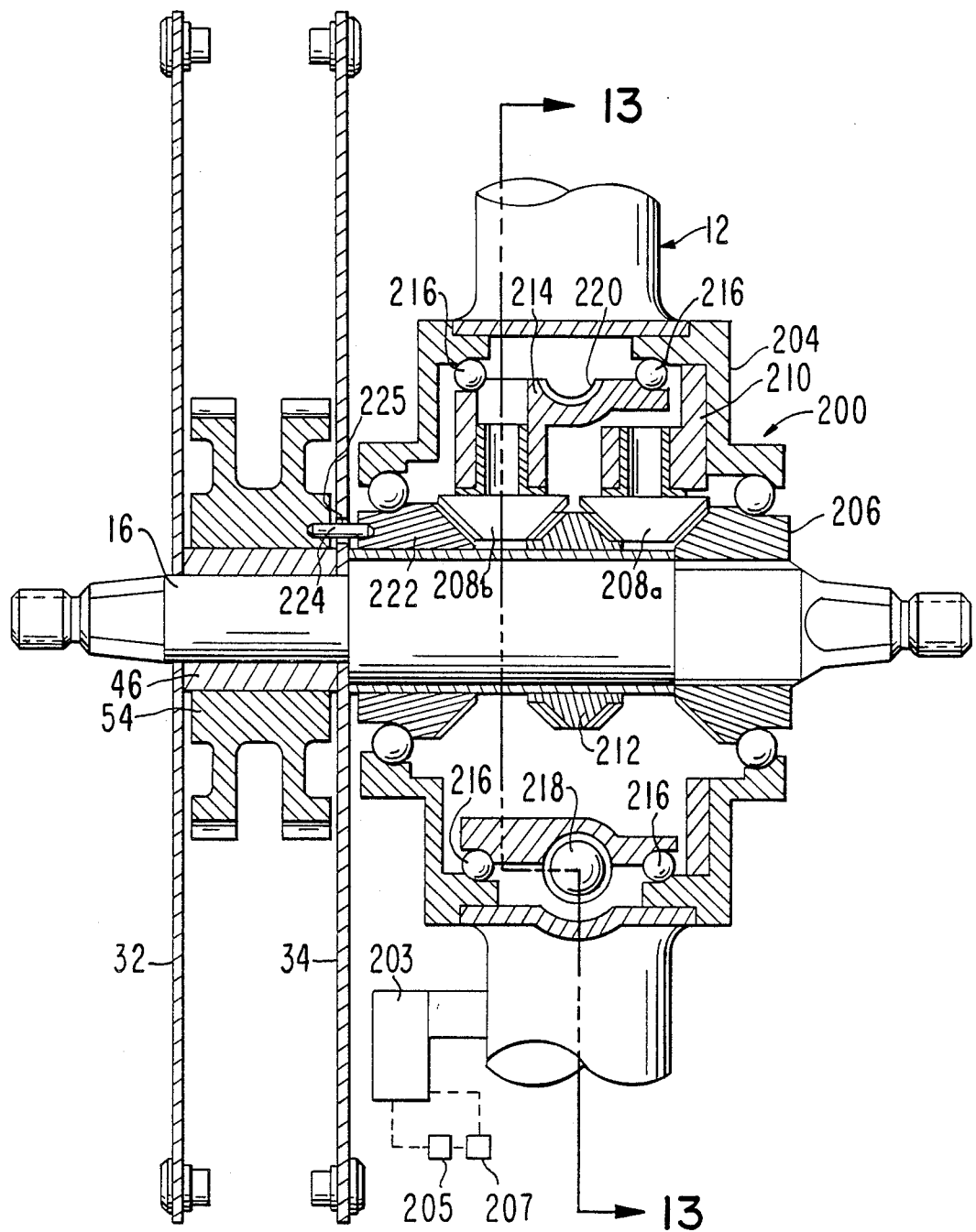
FIG. 12 is a fragmentary, vertical section of another form of servo system which provides a continuously variable transmission as a function of speed.
Figure 13:
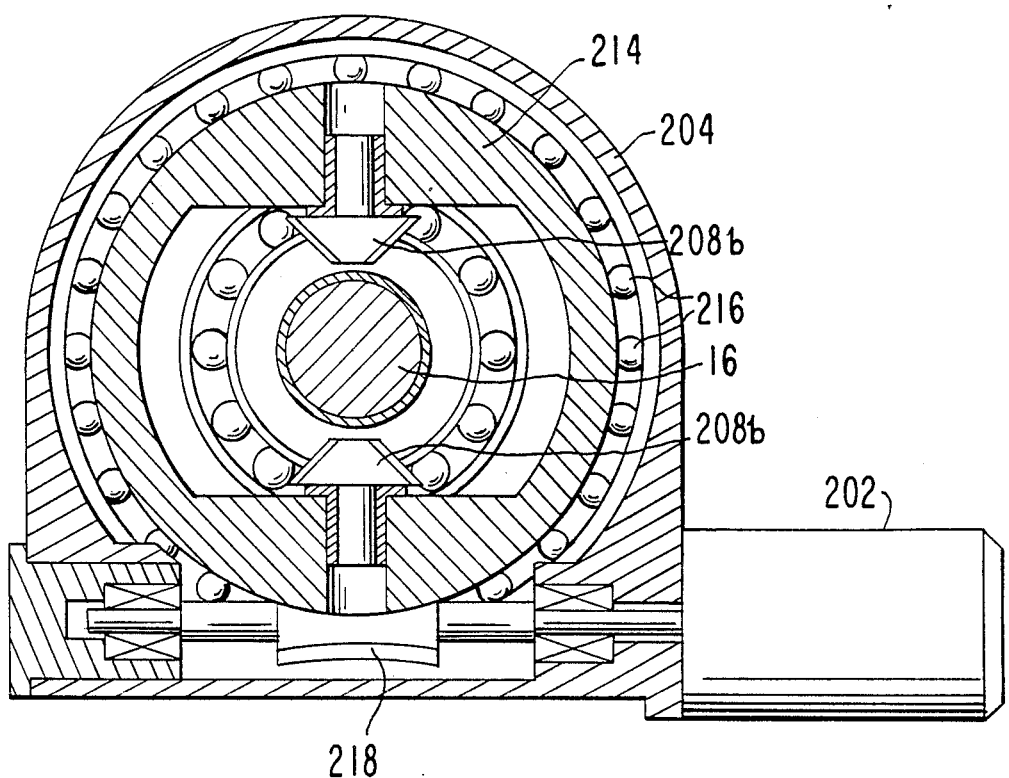
FIG. 13 is a cross-sectional view taken along line 13—13 of FIG. 12.

A third embodiment of the servo control system is shown in FIGS. 12 and 13 and is denoted by the numeral 200. Servo system 200 is formed by as an integral part of frame 12 and has pedal crank shaft 16 extending therethrough, the crank shaft having carrier plates 32 and 34 secured thereto and gear 54 mounted on crank shaft 16 about bushing 46 as shown in FIG. 12.

As in the previous servo systems described above with respect to FIGS. 6-11, system 200 will operate to change the effective diameter of the segments 58 coupled to the carrier plates 32 and 34 (FIG. 12) such segments being omitted in FIG. 12 to simplify the drawing. Such change in diameter of the segments 58 will be in response to the pedalling speed rather than in response to the pedalling effort. As used before in the previous servo systems, a generator/tachometer unit will be required on frame 12 to sense pedalling speed and maintain a charge on the battery which powers the servo motor 202 (FIG. 13). The generator/tachometer 203, a battery 205 and logic unit 207 are shown schematically in FIG. 12 and are carried in some suitable fashion, such as by bracket 209, by frame 12 and coupled to carrier plate 34 to sense pedalling speed.

In system 200, gear 54 between carrier plates 32 and 34 is driven from the pedal shaft 16 through differential gearing which causes the gear 54 to rotate slower than, at the same speed as, or faster than the carrier plates 32 and 34 in accordance with rotation of the servo motor.

The whole system is analogous to an automobile differential unit coupled to a reversing gear box on the right hand axle of the vehicle. If the drive shaft is held stationary, clockwise rotation of the right hand axle of the vehicle causes counter-clockwise rotation of the shaft between the reversing gears and the differential and clockwise rotation of the left hand axle at exactly the same speed as the right hand axle. If the drive shaft is rotated slowly, the speed on the left hand axle will be faster (or slower, depending upon the direction of drive shaft rotation) than that of the right hand axle. In the transmission of the present invention, this causes the effective diameter of the chain sprockets to increase or decrease.

System 10 includes a housing 204 which contains a gear assembly including a driving side gear 206 which is keyed to pedal crank shaft 16 for rotation with the crank shaft at pedal shaft speed. A pair of pinion gears 208a (only one of which is shown in FIG. 12) on the right hand side of the mechanism are supported by a stationary carrier 210 in housing 204 (FIG. 12). Pinion gears 208a are in mesh with the driving side gear 206 and with a floating side gear 212 mounted on pedal crank shaft 16. The floating side gear 212 is driven at the same speed as the driving side gear 206 but in the opposite direction.

Pinion gears 208b (only one of which is shown) on the left hand side of floating side gear 212 are mounted in a carrier device 214 coupled by bearings 216 to housing 204. Thus, carrier device 214 allows pinion gears 208b to be rotated about crank shaft 16 by turning worm 218 (FIGS. 12 and 13) which is in constant mesh with a worm gear 220 on the outer periphery of carrier device 214. Being a worm gear drive, it is not reversible. Torque on carrier device 214 cannot rotate the worm 218. Thus, movement of carrier device 214 will occur only when the worm 218 is turned by servo motor 202.

If servo motor 202 is not actuated by the generator/tachometer signal, carrier device 214 will not rotate, and the left hand pinion gear 208b will cause a driven side gear 222 to rotate in the same direction and at exactly the same speed as pedal crank shaft 16. Spur gear 54 in the transmission is connected to driven side gear 222 by a pin 224 which pass through a curved slot 225 in carrier plate 34. Maximum rotation of gear 54 with respect to carrier plate 34 is less than 90°; thus, the slot 225 typically has an arc length of about 90°.

With no relative movement between gear 54 and carrier plates 32 and 34, the segments 58 of the transmission maintain their effective operative positions as shown in FIG. 1, which allows the segments to move into any position between minimum and maximum diameter.

If, however, the control system 200 observes that the rider's pedalling speed has dropped below or risen above the preset optimum range (60 to 80 rpm), the system energizes worm gear motor 202 in either the forward or reverse direction. This action turns the worm 218 which rotates carrier device 214 which causes spur gear 54 to rotate faster or slower than pedal crank shaft 16 and the carrier plates 32 and 34, causing the transmission to change effective diameter. The generator/tachometer 203 coupled with carrier plate 34 will also sense pedal shaft position and will not energize servo motor 202 during the period of rotation when both driving sprockets 72a are simultaneously engaged in the chain. This is necessary to prevent the chain from jumping off the sprockets when reducing diameter or from "hanging up" between driving sprockets when increasing diameter.

I claim:

1. Transmission apparatus comprising:
    a support;
    a crank shaft rotatable about its axis on the support;
    a carrier member mounted on the crank shaft for rotation therewith about said axis;
    a pair of segments pivotally mounted on the carrier member for movement toward and away from the crank shaft, each segment having a rotatable drive element mounted thereon at a location spaced from said axis, said drive elements being diametrically opposed to each other with reference to said axis;
    a gear mounted on the crank shaft for rotation relative thereto, said segments having gear means in mesh with the gear to synchronize the pivotal movements of said segments;
    an endless, flexible drive member coupled to the drive elements, the drive elements being pivoted toward the crank shaft as a function of the torque applied to the crank shaft;
    means biasing the segments in a direction away from the crank shaft; and
    means on the support and spaced from the crank shaft for keeping a portion of the drive member under tension as the crank shaft is rotated.

2. Apparatus as set forth in claim 1, wherein each drive element is a sprocket and the drive member is a chain.

3. Apparatus as set forth in claim 1, wherein said bias means includes an endless, flexible resilient spring element, and pin means coupling the spring element to the segments.

4. Apparatus as set forth in claim 3, wherein said carrier member has a pair of opposed sides, the segments being adjacent to one side of the carrier member and the spring element being adjacent to the other side of the carrier member.

5. Apparatus as set forth in claim 3, wherein said carrier member has a number of holes therethrough, said pin means including a pin for each segment, respectively, the pins extending through respective holes in the carrier member.

6. Apparatus as set forth in claim 1, wherein said segments are mounted on the carrier member for rotation about axes parallel to the axis of the crank, shaft.

7. Apparatus as set forth in claim 6, wherein the axis of pivotal movement of each drive element on the respective segment is parallel with the axis of the crank shaft.

8. Apparatus as set forth in claim 1, wherein is included a crank arm for each end, respectively, of the crank shaft.

9. Apparatus as set forth in claim 1, wherein is included a crank arm coupled to one end of the crank, said arm being adapted for use in applying torque to the crank shaft.

10. Apparatus as set forth in claim 1, wherein each drive element has means for limiting the angle of rotation of the drive element relative to the respective segment.

11. Apparatus as set forth in claim 10, wherein said limit means include an endless, flexible spring element, and pin means coupling the spring element to the respective segment and to the respective drive element.

12. Apparatus as set forth in claim 11, wherein the spring element substantially limits the angle of pivotal movement of the drive element relative to the segment to an angle in the range of 15° to 20°.

13. Apparatus as set forth in claim 10, wherein said spring element includes a resilient O-ring.

14. Apparatus as set forth in claim 1, wherein is included a number of other segments pivotally mounted on the carrier member between the pair of segments, each other segment having a drive element thereon, said drive member being movable into coupled relationship with the other elements successively as a function of the rotation of the crank shaft about its axis.

15. Apparatus as set forth in claim 1, wherein said keeping means includes a linear damper.

16. Apparatus as set forth in claim 1, wherein said keeping means includes an arm pivotally mounted on the support and having idler means thereon for coupling the arm to the drive member, and means biasing the drive member in a direction to keep a portion of the drive member under tension.

17. Apparatus as set forth in claim 16, wherein said arm has a pair of opposed ends, one end of the arm being pivotally mounted on the support, said bias means being coupled with the arm intermediate the ends thereof, there being an idler device on the opposite end of the arm, said idler device being coupled with the drive member.

18. Apparatus as set forth in claim 1, wherein each segment includes a body having three sides, each segment being mounted for pivotal movement about an axis passing through the junction of two of said sides, the third side being in mesh with the gear, each drive element being pivotally mounted on the respective segment for rotation about an axis passing through the junction between one of the two sides and the third side.

19. Apparatus as set forth in claim 18, wherein said bias means includes an endless flexible resilient spring element, and pin means carried by a first side of each segment, respectively, the said spring element being coupled to the pin means.

20. Apparatus as set forth in claim 1, wherein said carrier member has a circular outer periphery, each segment being pivotally coupled to the carrier member adjacent to said outer periphery thereof.

21. Apparatus as set forth in claim 1, wherein each drive sprocket has means for limiting the angle of rotation of the drive sprocket relative to the respective pair of segments.

22. Apparatus as set forth in claim 21, wherein said limit means include an endless, flexible spring element, and pin means coupling the spring element to the respective segment and to the respective drive sprocket.

23. Apparatus as set forth in claim 22, wherein said spring element includes a resilient O-ring.

24. Apparatus as set forth in claim 22, wherein the spring element substantially limits the angle of pivotal movement of the drive element relative to the respective segment to an angle in the range of 15° to 20°.

25. Transmission apparatus for a bicycle having a frame, a central hub and a rear sprocket comprising:
a rotatable crank shaft adapted to be mounted on the central hub of the bicycle, said crank shaft having a pair of opposed ends, each end having a pedal arm mounted thereon;
a pair of spaced, generally parallel carrier plates mounted on the crank shaft for rotation therewith, each carrier plate having an outer periphery;
a pair of drive sprockets;
a pair of segments between the carrier plates for each drive sprocket, respectively, there being a segment of each pair pivotally coupled to a respective carrier plate near the outer periphery thereof, each pair of segments having a respective drive sprocket between the segments and rotatably mounted thereon at a location spaced from the axis of rotation of the respective pair of segments relative to the carrier plates;
a gear adapted to be coupled to the crank shaft for rotation relative thereto about the axis of the crank shaft, said segments having gear means thereon in mesh with the gear coupled to the crank shaft to synchronize the pivotal movements of the segments on the carrier plates;
an endless, flexible chain movable successively into coupled relationship to the sprockets as the carrier plates rotate under the influence of the crank shaft, said chain adapted to be coupled to the rear sprocket of the bicycle, said segments being movable inwardly toward the crank shaft as the torque requirements on the crank shaft increase;
means biasing the segments in a direction away from the crank shaft; and
a linear damper adapted to be coupled to the frame of the bicycle near the rear sprocket thereof, said damper being operable to keep a portion of the chain under tension as the crank shaft is rotated.

26. Apparatus as set forth in claim 25, wherein said bias means includes an endless, flexible resilient spring element for each carrier member, respectively, and pin means coupling the spring element to the segments.

27. Apparatus as set forth in claim 26, wherein each carrier member has an outer face, each spring element being adjacent to the outer face of the respective carrier member.

28. Apparatus as set forth in claim 26, wherein each carrier member has a number of holes therethrough, said pin means including a pin for each segment, respectively, the pins extending through respective holes in the corresponding carrier member.

29. Apparatus as set forth in claim 25, wherein said segments are mounted on the carrier members for rotation about axes parallel to the axis of the crank shaft.

30. Apparatus as set forth in claim 21, wherein is included a number of other pairs of segments pivotally mounted on the carrier member between the pairs of segments having said drive sprockets, each other pair of segments having an idler sprocket thereon, said drive chain being movable into coupled relationship with the idler sprockets successively as a function of the rotation of the crank shaft about its axis.

31. Apparatus as set forth in claim 21, wherein said linear damper includes an arm pivotally mounted on the support and having idler means thereon for coupling the arm to the drive chain, and means biasing the drive member in a direction to keep a portion of the drive chain under tension.

32. Apparatus as set forth in claim 31, wherein said arm has a pair of opposed ends, one end of the arm adapted to be pivotally mounted on the frame, said bias means being coupled with the arm intermediate the ends thereof, there being an idler device on the opposite end of the arm, said idler device being coupled with the drive chain.

33. Apparatus as set forth in claim 21, wherein each segment includes a body having three sides, each segment being mounted for pivotal movement about an axis passing through the junction of two of said sides, the third side being in mesh with the gear, each drive sprocket being pivotally mounted on the respective segments for rotation about an axis passing through the junction between one of the two sides and the third sides.

34. Apparatus as set forth in claim 33, wherein said bias means includes an endless flexible resilient spring element, and pin means carried by a first side of each segment, respectively, the said spring element being coupled to the pin means.

35. Transmission apparatus comprising:
a support;
a crank shaft rotatable about its axis on the support;
a carrier member mounted on the crank shaft for rotation therewith about said axis;
a pair of spaced segments pivotally mounted on the carrier member for movement toward and away from the crank shaft, each segment having a rotatable drive element mounted thereon at a location spaced from said axis;
a gear mounted on the crank shaft for rotation relative thereto, said segments having gear means in mesh with the gear;
an endless, flexible drive member coupled to the drive elements, the drive elements being pivoted toward the crank shaft as a function of the movement of the crank shaft relative to said support; and
means biasing the segments in a direction away from the crank shaft, and means on the support and spaced from the crank shaft for keeping a portion of the drive member under tension as the crank shaft is rotated.

36. Apparatus as set forth in claim 35, wherein said drive elements are pivoted toward the crank shaft as a function of the torque applied to the crank shaft and thereby said carrier member.

37. Apparatus as set forth in claim 35, wherein is included a servo system operable for pivoting the drive elements toward the crank shaft as a function of the speed of rotation of the crank shaft relative to said support.

38. Apparatus as set forth in claim 37, wherein said servo system includes a motor for each segment, respectively, a generator/tachometer unit carried by the support and coupled with the motors, a power source coupled with the generator/tachometer unit, and brush means coupling the motors to the unit and the power source.

39. Apparatus as set forth in claim 38, wherein each motor includes an end pivotally coupled to the carrier member, there being a drive shaft on the motor, a screw coupled with the drive shaft, and a nut pivotally mounted on the respective segment and threadably coupled to the screw, whereby rotation of the drive shaft of the motor will cause pivotal movement of the respective segment relative to the carrier member.

40. Apparatus as set forth in claim 37, wherein said servo system includes a generator/tachometer unit carried by the support and the carrier member for generating a signal, there being a motor coupled with the drive member at a location spaced from the crank shaft for receiving a signal from the generator/tachometer unit and being energized by the signal, said motor being a part of said keeping means.

41. Apparatus as set forth in claim 40, wherein said generator/tachometer unit includes a stator assembly carried by the support and a rotor assembly carried by the carrier member.

42. Apparatus as set forth in claim 40, wherein said motor includes a drive shaft, said keeping means including an arm pivotally mounted on the support and having idler means coupled with the drive member, there being a nut pivotally coupled to the arm intermediate the ends thereof and a screw coupled with the nut and secured to the drive shaft of the motor, whereby the screw will move the nut and thereby said arm as the screw is rotated under the influence of the drive shaft of the motor.

43. Apparatus as set forth in claim 37, wherein said servo system includes a gear assembly mounted on the crank shaft, one element of the gear assembly being rotatable on the crank shaft, means coupling said one element to the gear for rotating the gear through a predetermined angle to thereby move the segments toward and away from the crank shaft, and a servo motor coupled with said one element to rotate the latter on the crank shaft.

44. Apparatus as set forth in claim 43, wherein said coupling means includes a pin connecting said element with said gear.

45. Apparatus as set forth in claim 43, wherein said carrier member is between the gear and the element, said carrier member having a slot, and said mounting means includes a pin extending through the slot and coupled at the ends thereof to the gear and the element.

46. Apparatus as set forth in claim 43, wherein is included a generator/tachometer unit carried by the support and the carrier member for generating a signal, said servo motor being coupled with the generator/tachometer unit for receiving a signal therefrom being energized by the signal.

47. Apparatus as set forth in claim 46, wherein said generator/tachometer unit includes a stator assembly carried by the support and a rotor assembly carried by the carrier member.

48. Apparatus as set forth in claim 43, wherein said gear assembly includes a first driving side gear coupled to the shaft for rotation therewith, a pair of pinion gear is coupled with the driving side gear, a carrier for mounting the pinion gear for rotation about the crank shaft, said element including a second driving side gear in mesh with said pinion gear, and means coupling the servo motor with the carrier to rotate the carrier and thereby the pinion drive gear through a predetermined arc to cause rotation of the gear on the shaft.

49. Apparatus as set forth in claim 48, wherein said carrier comprises a worm gear and said means coupling the servo motor with the carrier comprises a worm.

50. Apparatus as set forth in claim 49, wherein the means coupling the gear to the second driving side gear comprises a pin.

* * * * *